(12) United States Patent
Lal et al.

(10) Patent No.: US 12,741,346 B2
(45) Date of Patent: Sep. 22, 2026

(54) TANGLESS HELICALLY COILED INSERT INSTALLATION SYSTEM

(71) Applicant: HOWMET AEROSPACE INC., Pittsburgh, PA (US)

(72) Inventors: Praneel Prithvi Lal, Lynbrook (AU); Diego Adolfo Rodriguez Cantor, Pakenham (AU)

(73) Assignee: HOWMET AEROSPACE INC., Pittsburgh, PA (US)

( * ) Notice: Subject to any disclaimer, the term of this patent is extended or adjusted under 35 U.S.C. 154(b) by 0 days.

(21) Appl. No.: 18/857,368

(22) PCT Filed: May 10, 2022

(86) PCT No.: PCT/US2022/028555
§ 371 (c)(1),
(2) Date: Oct. 16, 2024

(87) PCT Pub. No.: WO2023/219606
PCT Pub. Date: Nov. 16, 2023

(65) Prior Publication Data
US 2025/0262695 A1 Aug. 21, 2025

(51) Int. Cl.
*B23P 19/00* (2006.01)

(52) U.S. Cl.
CPC .................................. *B23P 19/004* (2013.01)

(58) Field of Classification Search
CPC ............................. B25B 27/143; B23P 19/004
See application file for complete search history.

(56) References Cited

U.S. PATENT DOCUMENTS 2,390,524 A * 12/1945 Eckener ................ B25B 27/143 470/48
2,453,840 A * 11/1948 Geertsema ............ B25B 27/143 29/240.5

(Continued)

FOREIGN PATENT DOCUMENTS

DE 1183450 B * 12/1964
DE 19813705 A1 * 11/1999 ........... B25B 27/143

(Continued)

OTHER PUBLICATIONS

Machine translation of DE-102009037346-A1 (Year: 2011).*

(Continued)

*Primary Examiner* — Kyle A Cook
(74) *Attorney, Agent, or Firm* — CANTOR COLBURN LLP

(57) ABSTRACT

An automated installation system, constructed to install tangless helically coiled inserts, includes an installation tool, a track, and an insert separator device. The tool includes a nozzle body defining a through-bore extending along an insertion axis, and a mandrel adapted to reciprocate and rotate within the bore. The track defines a channel extending along a first centerline for the travel of inserts disposed in the channel and to the installation tool. The device is mounted to the track and includes a shuttle adapted to intersect and move in the channel. The shuttle defines a through-bore having an axis aligned to the first centerline when in a first position for acceptance of an insert from the channel, and is aligned to a second centerline for expulsion of the insert from the track and into the installation tool. The second centerline is offset from the first centerline, and intersects the insertion axis.

12 Claims, 8 Drawing Sheets

(56) References Cited

U.S. PATENT DOCUMENTS

| | | | | |
|---|---|---|---|---|
| 2,997,782 A * | 8/1961 | Eddy | B25B 27/143 29/240.5 |
| 4,553,302 A | 11/1985 | Cosenza et al. | |
| 5,212,865 A * | 5/1993 | Davis | B25B 27/143 29/240.5 |
| 6,035,519 A * | 3/2000 | Albright | B23P 19/002 221/172 |
| 6,367,138 B1 * | 4/2002 | Newton | B25B 27/143 29/240.5 |
| 2003/0024594 A1 * | 2/2003 | Szewc | B25B 27/143 140/124 |
| 2003/0051584 A1 | 3/2003 | Giannakakos et al. | |
| 2007/0245533 A1 | 10/2007 | Szewc et al. | |
| 2012/0272491 A1 * | 11/2012 | Hondo | B25B 27/143 29/240.5 |
| 2012/0324689 A1 * | 12/2012 | Li | B25B 27/143 29/240.5 |

FOREIGN PATENT DOCUMENTS

| | | | | |
|---|---|---|---|---|
| DE | 102009037346 A1 * | 2/2011 | B25B 27/143 |
| EP | 0350370 A1 * | 1/1990 | B21J 15/32 |
| GB | 842342 A * | 7/1960 | B25B 27/143 |
| GB | 866662 A | 4/1961 | |
| JP | S5133299 U | 3/1976 | |
| JP | S52124667 A | 10/1977 | |
| JP | S60191774 A | 9/1985 | |
| KR | 20110071304 A | 6/2011 | |

OTHER PUBLICATIONS

Machine translation of EP-0350370-A1 (Year: 1990).*

International Search Report issued in International Application No. PCT/US2022/028555; date of mailing Sep. 19, 2022; 4 pages.

Written Opinion issued in International Application No. PCT/US022/028555; date of mailing Sep. 19, 2022; 6 pages.

Notice of Reasons for Rejection issued in Japanese Application No. 2024-563928; Mailing Date: May 12, 2026.

* cited by examiner 82
84
86

24
74
54
78
9
9
58
68
78
62
76
90
88
32

88
32
62
82
64
76
89
60
78
34
58
72
68
78
70
80
24
54
74

TANGLESS HELICALLY COILED INSERT INSTALLATION SYSTEM

CROSS REFERENCE TO RELATED APPLICATIONS

This application is a National Stage application of PCT/US2022/028555, filed May 10, 2022, which is incorporated by reference in their entirety herein.

BACKGROUND

The present disclosure relates to a tool, and more particularly to an installation system for installing a tangless helically coiled insert.

Helically coiled inserts are generally used within tapped holes of a parent material. Some known helically coiled inserts have tangs which must be removed after insertion into the tapped holes. Tangless helically coiled inserts are beneficial since they have no tangs to remove. Unfortunately, the known tools for installing tangless helically coiled inserts must first be manually, and individually, loaded into an insertion tool prior to driving the inserts into the tapped hole via the tool. In addition, known tools are known to have pitching errors and cross-threading problems between the tapped hole and the insert. It is desirable to develop an automated system where inserts are automatically fed to an insertion tool that upon receipt of the insert automatically installs the insert.

SUMMARY

An installation tool according to one, non-limiting, embodiment of the present disclosure is adapted to install tangless, helically coiled, inserts into a tapped hole. The installation tool comprises a tubular body extending along an insertion axis, the tubular body including a first end portion and an opposite second end portion, wherein the tubular body includes an internal surface defining a through-bore centered to the insertion axis and communicating through the first and second end portions, and a direction of insert travel is from the first end portion and through the second end portion along the insertion axis; an insert exit port defined by the internal surface at the second end portion, centered about the insertion axis, and in communication with the through-bore, wherein the through-bore includes a bore diameter that is larger than a port diameter of the insert exit port; an insert entry port defined by the first end portion and in communication with the through-bore; and a mandrel including a drive attachment end segment and an opposite threaded end segment, the mandrel including a staging position wherein the threaded end segment is axially displaced out of the tubular body enabling receipt of the tangless helically coiled insert through the insert entry port and into the through-bore, and a staged position wherein the tangless helically coiled insert is threaded upon the threaded end segment and is radially contracted via biased contact against the internal surface at the insert exit port.

Additionally to the foregoing embodiment, the internal surface converges radially inward from bore diameter and to the port diameter.

In the alternative or additionally thereto, in the foregoing embodiment, the installation tool further includes a tubular structure extending axially outward from the first end portion and defining a chamber extending along the insertion axis and in communication with the through-bore, wherein the threaded end segment is in the chamber when in the staging position.

In the alternative or additionally thereto, in the foregoing embodiment, the installation tool further comprises a feed tube extending along a centerline and being in communication with and projecting upstream from the insert entry port.

In the alternative or additionally thereto, in the foregoing embodiment, an obtuse angle is measured between the insertion axis at the tubular body and the centerline.

In the alternative or additionally thereto, in the foregoing embodiment, the through-bore at the first end portion is cylindrical and has the bore diameter.

In the alternative or additionally thereto, in the foregoing embodiment, the second end portion includes a reduction nozzle defining in-part the through-bore and including the insert exit port, wherein the portion of the through-bore at the reduction nozzle is frustum shaped.

In the alternative or additionally thereto, in the foregoing embodiment, the bore diameter is greater than an external diameter of the tangless helically coiled insert when in an unbiased state, and the port diameter is less than the external diameter.

In the alternative or additionally thereto, in the foregoing embodiment, the installation tool further comprises an insert removal device engaged to the first end portion and disposed axially proximate to the insert entry port, the insert removal device including a block constructed to extend into and out of the through-bore to remove slipped tangless helically coiled inserts from the threaded end segment when the threaded end segment is axially aligned to the block.

In the alternative or additionally thereto, in the foregoing embodiment, rotation of the mandrel when the block is extended causes contact of an end of the tangless helically coiled insert with the block and thus unthreading of the tangless helically coiled insert from the threaded end segment.

An automated installation system, according to another non-limiting embodiment of the present disclosure installs tangless helically coiled inserts, The installation system comprises an installation tool including a nozzle body defining a through-bore extending along an insertion axis, and a mandrel adapted to reciprocate and rotate within the bore; a track defining a channel extending along a first centerline for the travel of a plurality of tangless helically coiled inserts disposed in the channel and to the installation tool; and an insert separator device mounted to the track and including a shuttle adapted to intersect and move in the channel, wherein the shuttle defines a through-bore having an axis aligned to the first centerline when in a first position for acceptance of a tangless helically coiled insert from the channel, and aligned to a second centerline for expulsion of the tangless helically coiled insert from the track and into the installation tool, wherein the first centerline is offset from the second centerline and the second centerline intersects the insertion axis.

Additionally to the foregoing embodiment, the installation system further comprises a feed tube extending along the second centerline, wherein the feed tube is disposed upstream from the installation tool and downstream from the track, and is in communication with the bore.

In the alternative or additionally thereto, in the foregoing embodiment, the nozzle body defines an insert entry port in communication with the bore and centered about the second centerline, and the feed tube is engaged to the nozzle body and is in communication with the insert entry port, and wherein an obtuse angle is measured between the insertion axis and the second centerline at the feed tube.

In the alternative or additionally thereto, in the foregoing embodiment, the installation system further comprises a vacuum delivery device including a conduit for the transport of the plurality of tangless helically coiled inserts along the second centerline from the track and into the feed tube.

In the alternative or additionally thereto, in the foregoing embodiment, the plurality of tangless helically coiled inserts are aligned end-to-end in the channel.

In the alternative or additionally thereto, in the foregoing embodiment, the installation system further comprises an insert holding device mounted to the track and spaced upstream from the insert separator device, the insert holding device including a pin adapted to traversely reciprocate into and out of the channel for blocking travel of the plurality of tangless helically coiled inserts in the channel.

In the alternative or additionally thereto, in the foregoing embodiment, the installation system further comprises an insert presence sensor mounted to the track and disposed between the insert separator device and the insert holding device, the sensor configured to detect the presence of a tangless helically coiled insert immediately upstream of the shuttle when the through-bore of the shuttle is axially aligned to the second centerline.

In the alternative or additionally thereto, in the foregoing embodiment, the installation system further comprises a vibrating bowl assembly located upstream from the track and including a bowl and a helically coiled shelf, the bowl including an internal face defining a containment for the storage of a plurality of tangless helically coiled inserts, and the helically coiled shelf projecting laterally inward from the internal face for the travel of the plurality of tangless helically coiled inserts in a single line formation and into the channel.

In the alternative or additionally thereto, in the foregoing embodiment, the track defines a plurality of air holes in communication with and axially spaced along the track to propel the plurality of tangless helically coiled inserts.

In the alternative or additionally thereto, in the foregoing embodiment, the plurality of air holes are each angled toward the channel in a downstream direction for the flow of air into the channel.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
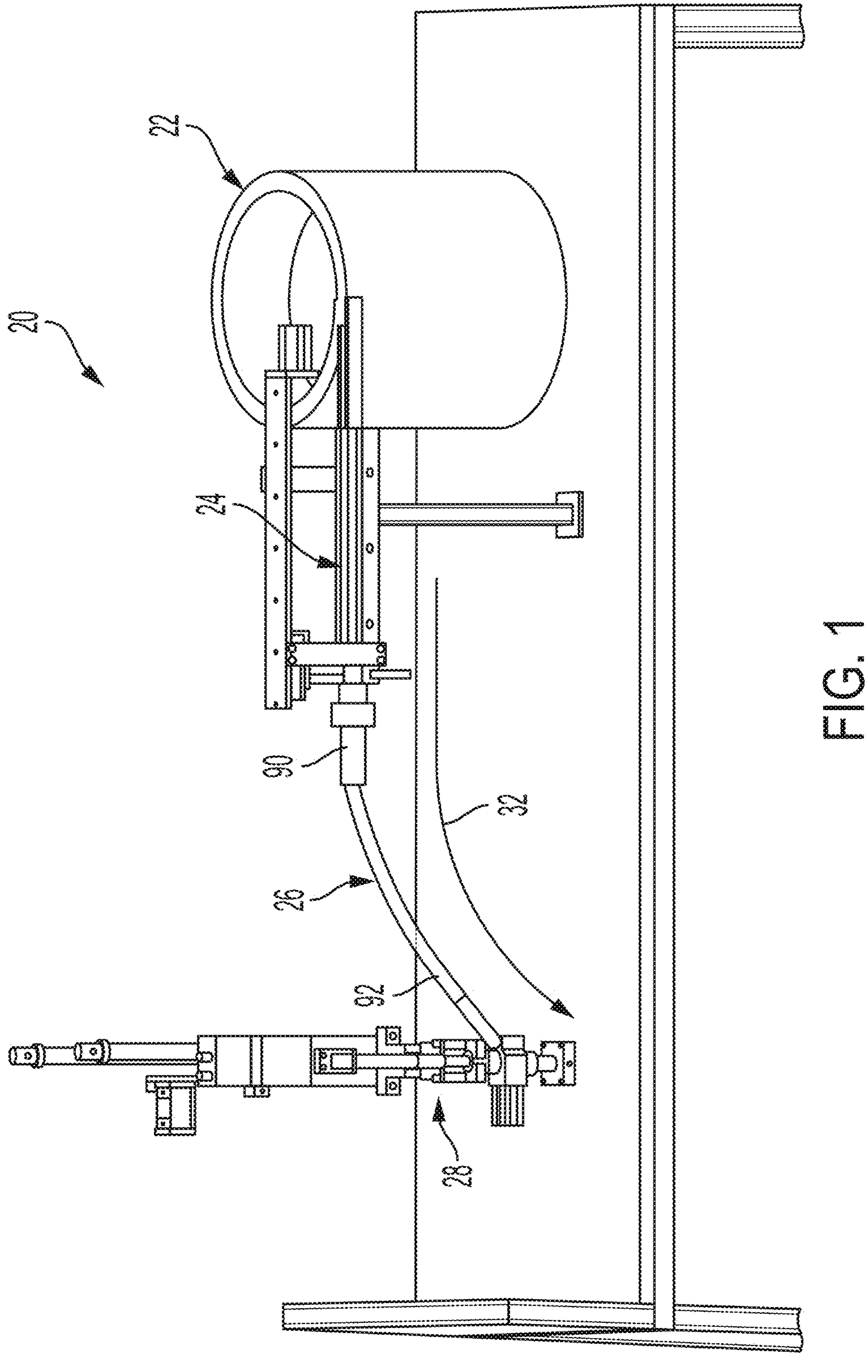
FIG. 1 is a perspective view of a tangless helically coiled insert installation system as one, non-limiting, exemplary embodiment of the present disclosure.

Referring to FIG. 1, an installation system 20 adapted to install tangless helically coiled inserts is illustrated. The system 20 includes a bowl assembly 22 (i.e., hopper), a track assembly 24, a vacuum delivery device 26, and an installation tool 28. The installation system 20 is constructed to move tangless helically coiled inserts 34 (see FIGS. 2-3) in a downstream direction (see arrow 32) from the bowl assembly 22, to the track assembly 24, then to the vacuum delivery device 26, and into the installation tool 28. In one embodiment, the bowl assembly 22 is a vibrating bowl assembly. In a non-limiting example, the vacuum delivery device 26 includes a flexible conduit that is under vacuum via a venturi effect to assist travel of the inserts 34 in the downstream direction 32.

Figure 2:
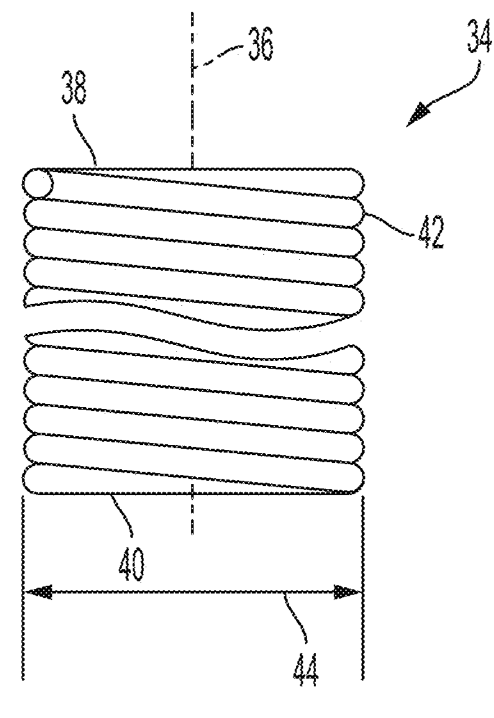
FIG. 2 is a side view of a tangless helically coiled insert worked upon by the system of FIG. 1.
Figure 3:
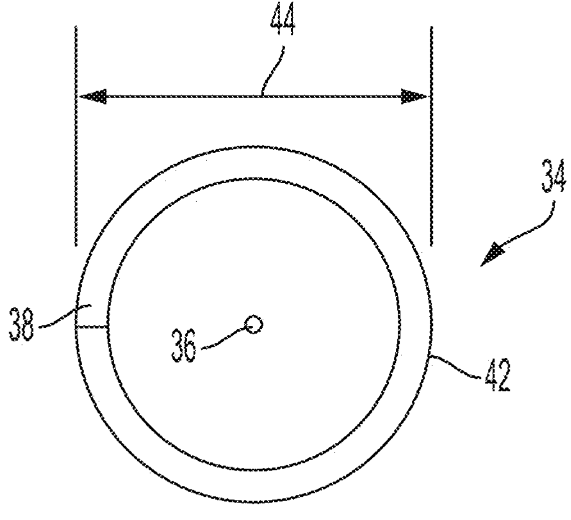
FIG. 3 is an end view of the tangless helically coiled insert.

Referring to FIGS. 2 and 3, the tangless helically coiled insert 34 is generally a wire that spirals around a center axis 36. The insert 34 is generally cylindrical, and is adapted to contract radially when placed into a threaded, or taped, hole in a parent material or workpiece (not shown). The insert 34 includes an axial first end 38, an opposite axial second end 40, and a generally cylindrical outer surface 42 that spans axially between the ends 38, 40. The outer surface 42 has a diameter (see arrow 44) when in an unbiased state (i.e., not contracted).

Figure 4:
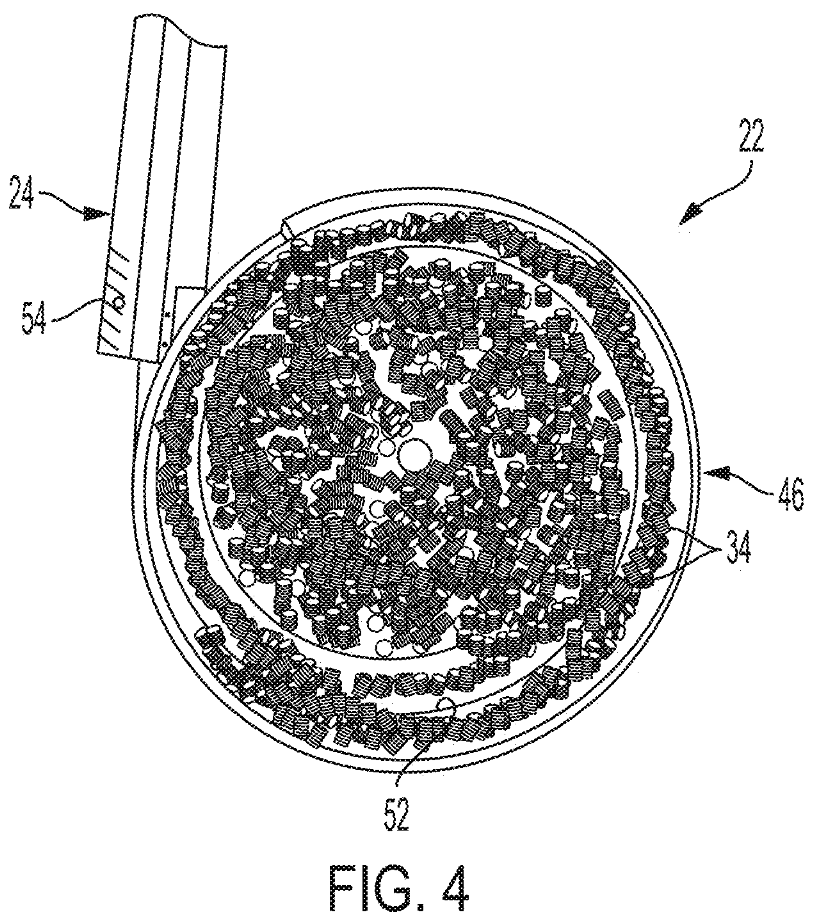
FIG. 4 is top-down view of a vibrating bowl assembly of the system.
Figure 5:
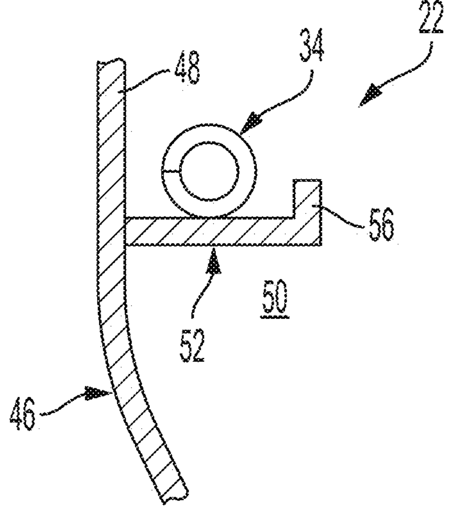
FIG. 5 is a partial cross section of the vibrating bowl assembly illustrating a shelf.

Referring to FIGS. 1, 4, and 5, the bowl assembly 22 includes a bowl 46 having a concave internal face 48 that defines a containment 50 for the bulk storage of the tangless helically coiled inserts 34. A helically coiled shelf 52 of the bowl assembly 22 laterally projects inward (i.e., into the containment 50) from the internal face 48. In operation and as the bowl 46 vibrates, the inserts 34 propagate upon the shelf 52 and move upward in a spiraling fashion and to an upstream end portion 54 of the track assembly 24 aligned to the shelf 52 for receipt of the inserts 34 in a single file and end 38 to end 40 (see FIG. 2) orientation. That is, the inserts 34 are laying down upon the insert sides 42 is a single line formation. In one embodiment, the shelf 52 may include an upward projecting lip 56 at a distal edge to assist in maintaining the inserts 34 upon the shelf 52. As illustrated in FIG. 4, the track assembly 24 is tangentially aligned to the bowl 46.

Referring to FIGS. 1, and 6-9, the track assembly 24 includes a track 58, an insert holding device 60, an insert separator device 62, and an insert presence sensor 64. The track 58 includes an elongated base 66 and opposing walls 68, 70 projecting upward from the base 66. The base 66 and walls 68, 70 together define a channel 72 extending along a centerline 74. The plurality of tangless helically coiled inserts 34 are received from the bowl assembly 22 at the upstream end portion 54 of the track 58 and into the channel 72 where the inserts travel along the centerline 74 in a single line and in an end-to-end fashion toward a downstream end portion 76 of the track 58. In one example, the devices 60, 62 may be pneumatically driven.

In one embodiment, the walls 68, 70 of the track 58 define a plurality of air holes 78 spaced axially along the track 58 to assist in the travel of the inserts 34. Each air hole 78 is angled toward the channel 72 in the downstream direction 32. In one example, an angle (see arrow 80 in FIG. 6) is measured at about forty-five degrees between each air hole 78 and the channel 72 from an upstream direction perspective. In operation, an air flow is directed through the holes 78 and into the channel 72 to push the inserts 34 in the downstream direction 32 and toward the downstream end portion 76 of the track 58.

Figures 6, 7, 8:
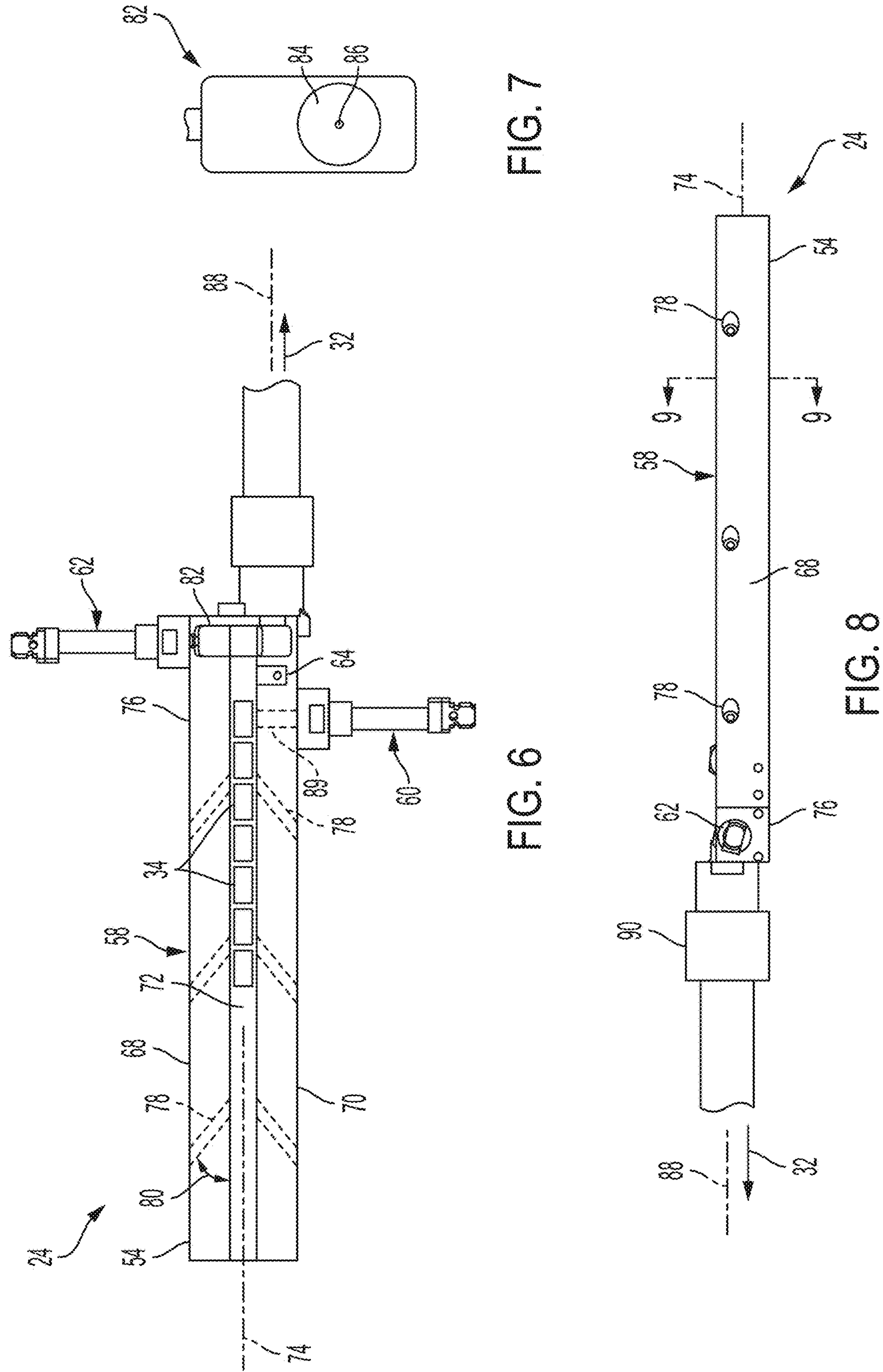
FIG. 6 is a top view of a track assembly of the system.
FIG. 7 is a side view of a shuttle of an insert separator device of the track assembly.
FIG. 8 is a side view of the track assembly.
Figure 9:
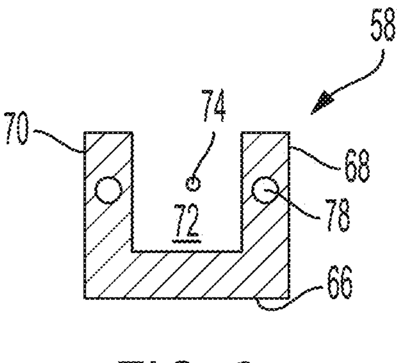
FIG. 9 is a cross section of a track of the track assembly taken along line 9-9 of FIG. 8.

Referring to FIGS. 6 and 7, the insert separator device 62 is mounted to the side wall 68 of the track 58 at the downstream end portion 76. The separator device 62 functions as a type of "gateway," and includes a shuttle 82. The shuttle 82 is adapted to intersect and move in the channel 72 for controlled capture of an insert 34 as demanded via use of the installation tool 28. The shuttle 82 defines a through-bore 84 centered about an axis 86 and sized for receipt of the leading insert 34 in the channel 72. In operation and when the installation tool demands an insert 34, the insert separator device 62 traverses the channel 72 until the bore axis 86 aligns with the channel axis 74. Once the leading insert 34 enters the bore 84 as indicated by the presence sensor 64 (located immediately upstream of the shuttle 82 in the channel 72), the insert separator device 62 actuates and moves the shuttle 82 until the bore axis 86 aligns with the centerline 88 of the vacuum delivery device 26. It is therefore noted that the centerline 74 of the track 58 is offset from the centerline 88 of the vacuum delivery device 26.

This offset is advantageous because it separates the track 58 from the vacuum delivery device 26. That is, the vacuum delivery device 26 is under a vacuum condition to assist in the delivery of inserts 34. The track 58, itself, is not under a vacuum. If the offset and associated shuttle 82 did not exist, there would be nothing to stop the travel of the insert, thus no controlled delivery of the insert 34. In one embodiment, only one insert 34 is delivered through the vacuum delivery device 26 at a time. The shuttle 82 further assists in positioning the next insert 34 to be delivered, as the leading insert travels through the vacuum delivery device 26.

Referring to FIG. 6 and in one example, the insert holding device 60 is mounted to the wall 70 of the track 58, and is spaced upstream from the insert separator device 62 and the presence sensor 64. The insert holding device 60 include a pin 89 adapted to transversely move into and out of the channel 72 for preventing travel of the inserts 34 along the channel 72. In operation, and when the presence sensor 64 detects the presence of a leading insert 34 generally axially between the devices 60, 62, the insert holding device 60 will actuate and extend the pin 89 into the channel 72, and thus contacting the side 42 of the insert 34 immediately upstream from the leading insert. With this contact, the insert 34 is biased against the opposing wall 68 of the track 58 preventing further travel.

Figure 10:
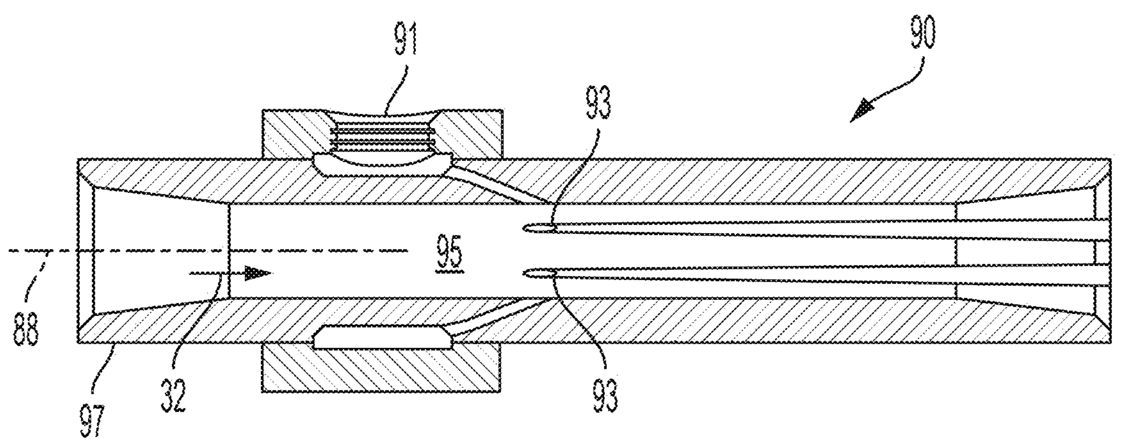
FIG. 10 is a cross section of a venturi structure of a vacuum delivery device of the system.

Referring to FIGS. 1, 8, and 10, the vacuum delivery device 26 includes a venturi structure 90 and a conduit 92 centered about the centerline 88. The conduit extends along the centerline 88 between the installation tool 28 and the track assembly 24. In one example, the conduit 92 is flexible enabling movement of the installation tool 28.

In operation, and as best shown in FIG. 10, compressed air enters the venturi structure 90 through an air supply port 91, and exits through a series of circumferentially spaced orifices 93 into the main channel 95. As compressed air exits the orifices 93, the velocity of the air increases to supersonic speed. The air forced through the center of the tube rotates. This cyclonic flow creates a vacuum at the upstream end portion 97 of the venturi structure 90. The vacuum created is strong enough to draw the inserts 34 from the shuttle 82 and through the venturi structure 90.

Figure 11:
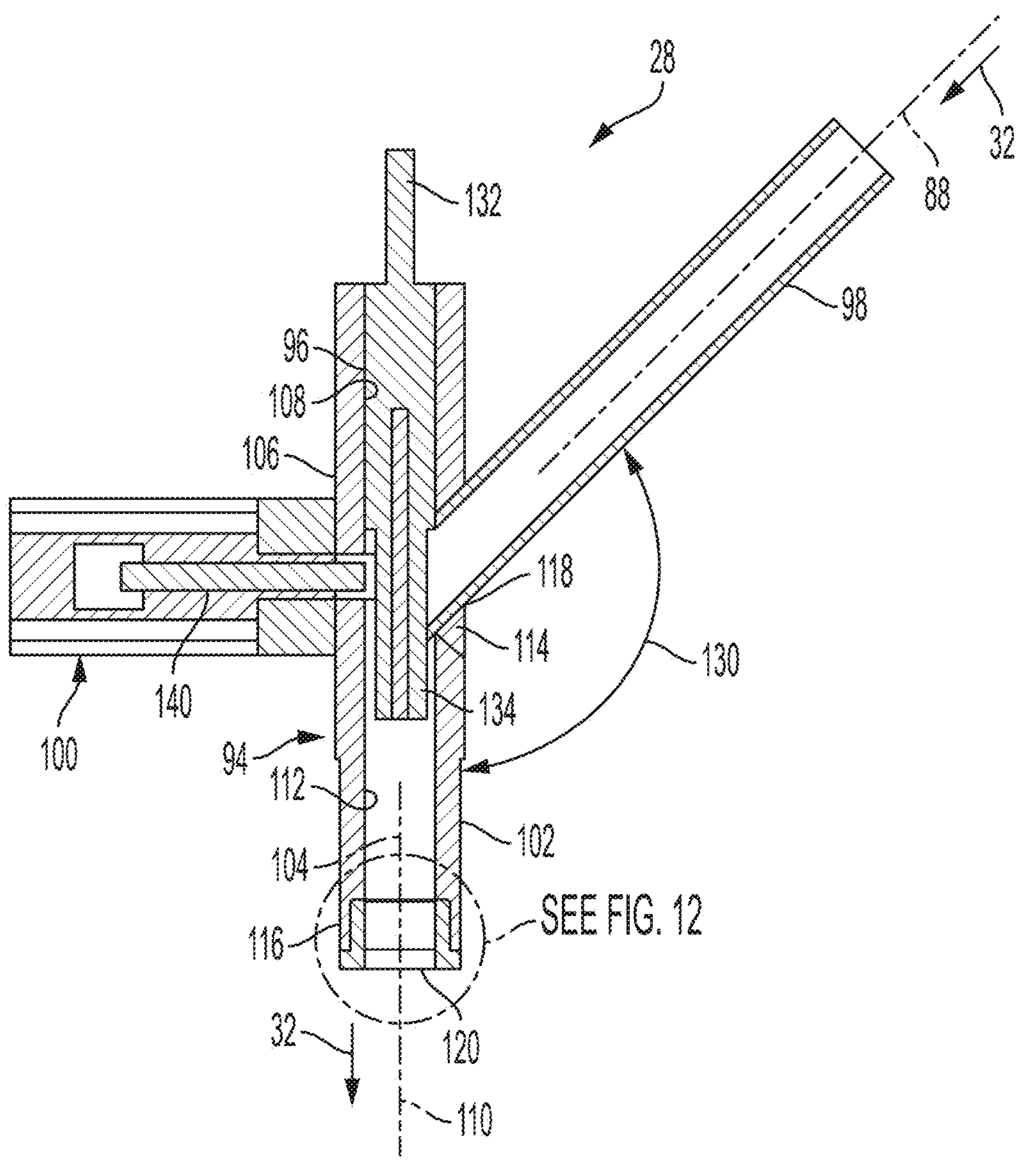
FIG. 11 is a cross section of an installation tool of the system.

Referring to FIGS. 1 and 11, the insert installation tool 28 includes a nozzle body 94, a mandrel 96, a feed tube 98, and an insert removal device 100. The nozzle body 94 includes a tubular body 102 that defines a through-bore 104, and a structure 106 that defines a chamber 108. The through-bore 104 and the chamber 106 extend along a common insertion axis 110, and are in axial communication with one-another. The mandrel 96 is adapted to rotate and axially reciprocate within the chamber 106 and the through-bore 104. In one example, the nozzle body 94 with the tubular body 102 and the tubular structure 104 is one unitary piece. In one example, the structure 106 is tubular.

The tubular body 102 includes an internal surface 112 that defines the through-bore 104 and axially spans between opposite end portions 114, 116 of the body. End portion 114 is attached to the structure 106 and the end portion 116 is a distal end portion. During operation, the direction of travel (i.e., downstream direction 32) of the insert 34 is away from the end portion 114 and toward the end portion 116.

Figure 12:
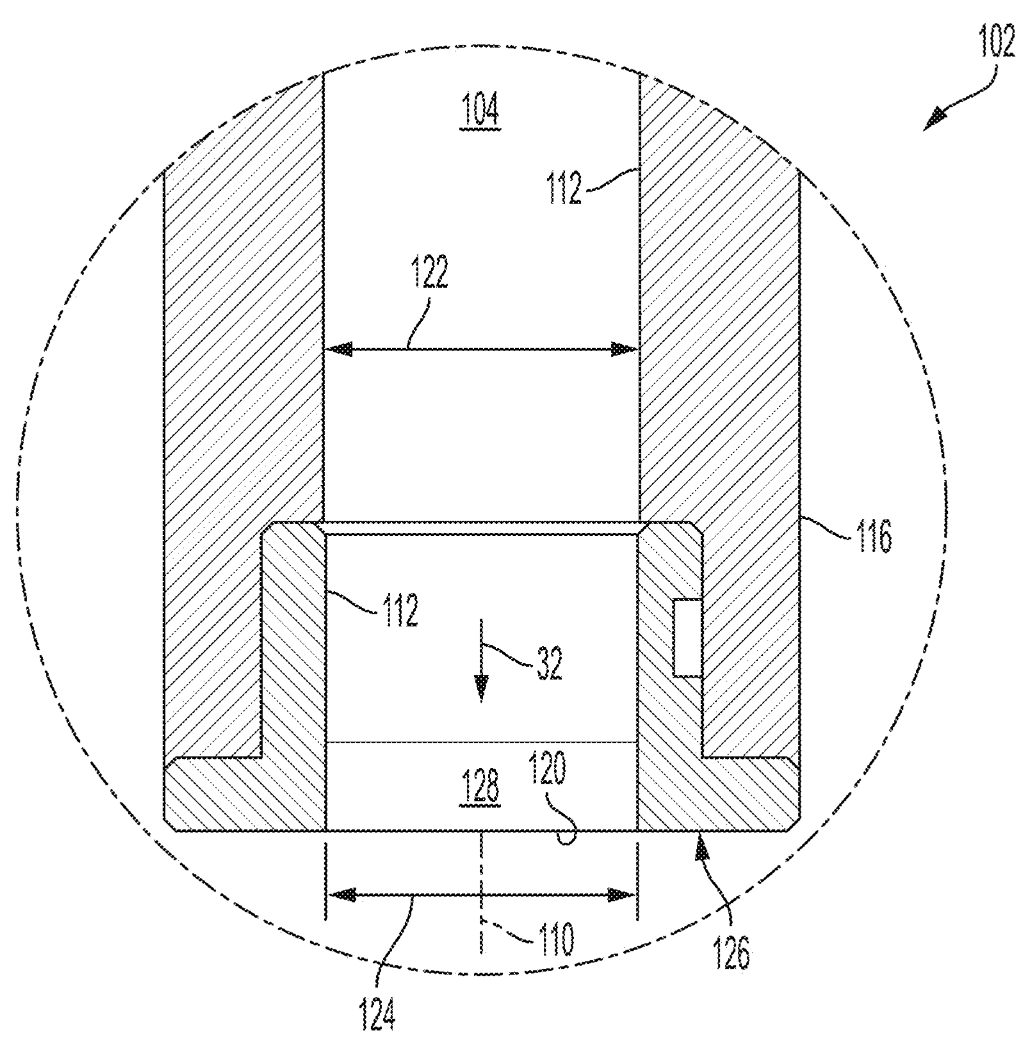
FIG. 12 is a partial cross section of a tubular body of the installation tool taken from circle 12 of FIG. 11.

Referring to FIGS. 11 and 12, the internal surface 112 defines an insert entry port 118 proximate to the end portion 114 and an insert exit port 120 at the distal end portion 116. Both ports 118, 120 are in communication with the through-bore 104. The exit port 120 is centered to the insertion axis 110, and the entry port 118 is centered to the centerline 88 such that the centerline 88 intersects the insertion axis 110. In one example, the end portion 114 includes the through-bore 104 having a bore diameter (see arrow 122), and the distal end portion 116 includes the exit port 120 having a diameter (see arrow 124) that is less than the bore diameter 122. The diameter 44 of the insert 34 (see FIG. 2) when in an unbiased state is less than the bore diameter 122 and greater than the exit port diameter 124.

In one example, the distal end portion 116 of the tubular body 102 includes, or may be, a reduction nozzle 126 that defines the exit port 120. The reduction nozzle 126 may include a portion of the internal surface 112 that is cylindrical. Downstream from the portion of the internal surface 112 that is cylindrical, the through-bore 104 may conform to a frustum shape (see bore portion 128) as it diverges radially from the diameter 122 to the port diameter 120 in the downstream direction 32. In one example the reduction nozzle 126 is separately attached to the distal end of the tubular body 102, and in another embodiment, the nozzle 126 is a unitary and integral part of the tubular body 102.

The feed tube 98 is in communication with the entry port 118, and projects outward therefrom along the centerline 88. In one example, the feed tube 98 is rigid and is rigidly engaged to the nozzle body 96 and proximate to the end portion 114 of the tubular body 102. To assist in the travel of the insert from the feed tube 98 and into the through-bore 104, an obtuse angle (see arrow 130) exists between the insertion axis 110 at the tubular body 102 and the centerline

88 at the feed tube 98. In one example, the obtuse angle may be about one-hundred and fifty degrees (150 degrees).

Figure 13:
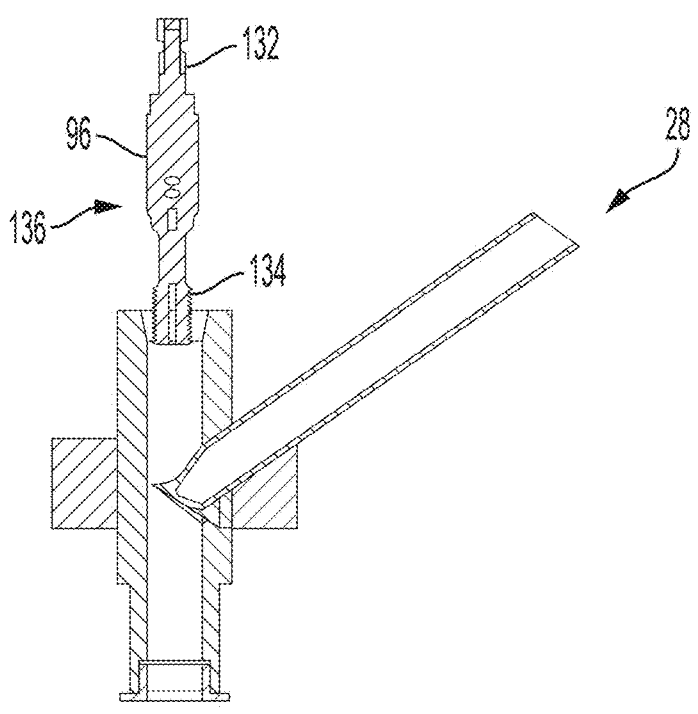
FIG. 13 is a cross section of the installation tool illustrating a mandrel in a staging position.
Figure 14:
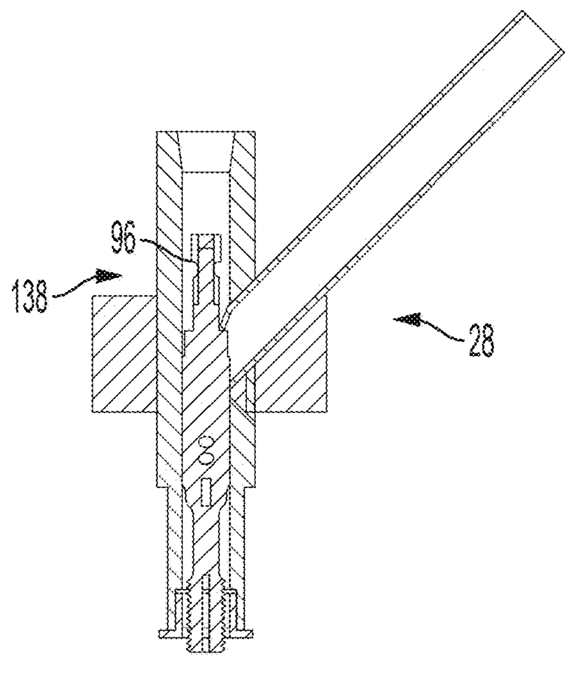
FIG. 14 is a cross section of the installation tool similar to FIG. 13 except with the mandrel in a staged position.

Referring to FIGS. 11, 13, and 14, the mandrel 96 includes a drive attachment end segment 132 and an opposite threaded end segment 134. The mandrel 96 is adapted to reciprocate within the nozzle body 94 and rotate about the insertion axis 110. In operation and when in a staging position 136 (see FIG. 13), the threaded end segment 132 is axially displaced out of the tubular body 102 enabling receipt of the insert 34 through the insert entry port 118 and into the through-bore 104. The insert 34 travels out of the feed tube 98 and is diverted into the through-bore 104 of the tubular body 102. Once in the tubular body 102, the insert 34 travels downward along the insertion axis 110 (e.g., by way of gravity) until the insert 34 (in its unbiased state) rests upon the end portion 116 generally at the frustum portion 128.

With continued operation, the mandrel 96 is then inserted into the through-bore 104. With this axial insertion, and rotation of the mandrel 96, the mandrel enters a staged position 138, the insert 34 is threaded upon the threaded end segment 134 as the insert 34 is biased against the internal surface 112 at the frustum portion 128 location (see FIG. 12). With continued insertion, and as the insert is biased through the exit port 120, the insert 34 radially contracts for accepts and threading into a tapped hole of a parent material or workpiece.

Referring to FIG. 11, the insert removal device 100 of the installation tool 28 is engaged to the end portion 114 of the tubular body 102, and is disposed axially proximate to the insert entry port 118. The insert removal device 100 includes a block 140 constructed to extend into and out of the through-bore 104 to remove slipped tangless helically coiled inserts 34 from the threaded end segment 134 of the mandrel 96 when the threaded end segment 134 is axially aligned to the block 140. In one example, the device 100 may be pneumatically actuated.

In operation, when the system 20 detects that an insert 34 has slipped, and thus has not unthreaded from the threaded end segment 134, the block 140 is extended into the through-bore 104, and contacts an end of the insert 34. The mandrel 96 will then rotate in a reverse direction (e.g., counter-clockwise), thus unthreading the insert 34 from the threaded end segment 134. Once unthreaded, the insert 34 is free to fall down the through-bore 104 and toward the exit port 120.

Advantages and benefits regarding the installation system 20 include the automatic and continuous installation of tangless helically coiled inserts 34 from a bulk feeding mechanism. Other advantages include seamless installations by eliminating pitching errors and cross-threading, making the tool much less likely to seize when used on continuous automatic cycles.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An installation tool adapted to install tangless, helically coiled, inserts into a tapped hole, the installation tool comprising:

a tubular body extending along an insertion axis, the tubular body including a first end portion and an opposite second end portion, wherein the tubular body includes an internal surface defining a through-bore centered to the insertion axis and communicating through the first and second end portions, and a direction of insert travel is from the first end portion and through the second end portion along the insertion axis;

an insert exit port defined by the internal surface at the second end portion, centered about the insertion axis, and in communication with the through-bore, wherein the through-bore includes a bore diameter that is larger than a port diameter of the insert exit port;

an insert entry port defined by the internal surface proximate to the first end portion and in communication with the through-bore, the insert entry port being centered about a centerline that intersects the insertion axis and constructed to receive the tangless helically coiled insert through the insert entry port and into the through-bore when a mandrel is in a staging position; and the mandrel including a drive attachment end segment and an opposite threaded end segment, wherein the mandrel is configured to be positioned in the staging position wherein the threaded end segment is axially displaced out of the tubular body and is in a chamber enabling receipt of the tangless helically coiled insert through the insert entry port and into the through-bore, wherein the tangless helically coiled insert travels downward along the insertion axis until the tangless helically coiled insert rests upon the second end portion at an upstream end of a frustum shaped bore portion, and a staged position wherein the tangless helically coiled insert is threaded upon the threaded end segment and is radially contracted via biased contact against the internal surface at the insert exit port.

2. The installation tool set forth in claim 1, wherein the internal surface converges radially inward from the bore diameter and to the port diameter.

3. The installation tool set forth in claim 1, further comprising: a tubular structure extending axially outward from the first end portion and defining the chamber extending along the insertion axis and in communication with the through-bore, wherein the threaded end segment is in the chamber when in the staging position.

4. The installation tool set forth in claim 1, wherein the bore diameter is greater than an external diameter of the tangless helically coiled insert when in an unbiased state, and the port diameter is less than the external diameter.

5. The installation tool set forth in claim 1, further comprising an insert removal device engaged to the first end portion and disposed axially proximate to the insert entry port, the insert removal device including a block constructed to extend into and out of the through-bore to remove slipped tangless helically coiled inserts from the threaded end segment when the threaded end segment is axially aligned to the block.

6. The installation tool set forth in claim 1, wherein the mandrel is rotatable in a reverse direction to unthread a slipped tangless helically coiled insert from the threaded end segment such that the slipped tangless helically coiled insert is free to fall down the through-bore toward the insert exit port.

7. The installation tool set forth in claim 1, further comprising:

a feed tube extending along a centerline and being in communication with and projecting upstream from the insert entry port.

8. The installation tool set forth in claim 7, wherein an obtuse angle is measured between the insertion axis at the tubular body and the centerline of the feed tube.

9. The installation tool set forth in claim 1, wherein the through-bore at the first end portion is cylindrical and has the bore diameter.

10. The installation tool set forth in claim 9, wherein the second end portion includes a reduction nozzle defining in-part the through-bore and including the insert exit port, wherein the frustum-shaped bore portion of the through-bore is at the reduction nozzle and diverges radially from the bore diameter to the port diameter in the downstream direction.

11. An installation tool adapted to install tangless, helically coiled, inserts into a tapped hole, the installation tool comprising:

a tubular body extending along an insertion axis, the tubular body including a first end portion and an opposite second end portion, wherein the tubular body includes an internal surface defining a through-bore centered to the insertion axis and communicating through the first and second end portions, and a direction of insert travel is from the first end portion and through the second end portion along the insertion axis;

an insert exit port defined by the internal surface at the second end portion, centered about the insertion axis, and in communication with the through-bore, wherein the through-bore includes a bore diameter that is larger than a port diameter of the insert exit port;

an insert entry port defined by the first end portion and in communication with the through-bore;

a mandrel including a drive attachment end segment and an opposite threaded end segment, the mandrel including a staging position wherein the threaded end segment is axially displaced out of the tubular body enabling receipt of the tangless helically coiled insert through the insert entry port and into the through-bore, and a staged position wherein the tangless helically coiled insert is threaded upon the threaded end segment and is radially contracted via biased contact against the internal surface at the insert exit port;

a tubular structure extending axially outward from the first end portion and defining a chamber extending along the insertion axis and in communication with the through-bore, wherein the threaded end segment is in the chamber when in the staging position; and an insert removal device engaged to the first end portion and disposed axially proximate to the insert entry port, the insert removal device including a block constructed to extend into and out of the through-bore to remove slipped tangless helically coiled inserts from the threaded end segment when the threaded end segment is axially aligned to the block.

12. The installation tool set forth in claim 11, wherein rotation of the mandrel when the block is extended causes contact of an end of the tangless helically coiled insert with the block and thus unthreading of the tangless helically coiled insert from the threaded end segment.

* * * * *